United States Patent
Dietsch et al.

(10) Patent No.: US 7,363,128 B2
(45) Date of Patent: Apr. 22, 2008

(54) APPLICATION LAUNCHER

(75) Inventors: Douglas Jay Dietsch, Portage, MI (US); Matthew Wayne Starks, Burlington, MI (US); Steven Louis Melvin, Scotts, MI (US); Michael A. Bumgarner, Lawton, MI (US)

(73) Assignee: Eaton Corporation, Cleveland, OH (US)

( * ) Notice: Subject to any disclaimer, the term of this patent is extended or adjusted under 35 U.S.C. 154(b) by 571 days.

(21) Appl. No.: 10/952,024

(22) Filed: Sep. 28, 2004

(65) Prior Publication Data

US 2006/0069474 A1   Mar. 30, 2006

(51) Int. Cl.
*G01M 15/00* (2006.01)
*G06F 19/00* (2006.01)

(52) U.S. Cl. ............... 701/29; 701/2; 701/33; 701/35; 702/183; 715/819; 715/845

(58) Field of Classification Search ........... 701/29, 701/33, 25, 1, 2, 35; 702/183, 185; 714/25, 714/26; 715/700, 819, 841, 845
See application file for complete search history.

(56) References Cited

U.S. PATENT DOCUMENTS

| | | | | |
|---|---|---|---|---|
| 4,757,463 | A * | 7/1988 | Ballou et al. | 701/35 |
| 5,657,233 | A * | 8/1997 | Cherrington et al. | 705/400 |
| 6,066,146 | A * | 5/2000 | Carroll et al. | 606/148 |
| 6,097,998 | A * | 8/2000 | Lancki | 701/33 |
| 6,181,992 | B1 * | 1/2001 | Gurne et al. | 701/29 |
| 6,434,455 | B1 * | 8/2002 | Snow et al. | 701/33 |
| 6,493,615 | B1 * | 12/2002 | Johnston | 701/29 |
| 6,512,968 | B1 * | 1/2003 | de Bellefeuille et al. | 701/33 |
| 6,708,092 | B1 * | 3/2004 | Starks et al. | 701/29 |

* cited by examiner

*Primary Examiner*—Tan Q. Nguyen
(74) *Attorney, Agent, or Firm*—Rader, Fishman & Grauer PLLC (57) ABSTRACT

A computer, connected to a communications bus, includes a display that selectively displays a user interface. A plurality of diagnostic applications installed on the computer are capable of receiving data from the communications bus via the connection. Instructions executable on the computer provide a list of the diagnostic applications in the user interface, accept input indicating one of the diagnostic applications to be launched, and launch the indicated diagnostic application. In one embodiment, the communications bus is in a vehicle.

20 Claims, 7 Drawing Sheets

APPLICATION LAUNCHER

BACKGROUND OF THE INVENTION

This application relates to a software application launcher capable of controlling the launching of a plurality of software applications.

It is well known that vehicles such as cars and trucks include communications busses to which external processing devices can be attached for diagnostic purposes. Such external processing devices may include, among other things, handheld computers and laptop or desktop computers. Computers may be attached to the communications bus in a vehicle by a variety of different connections, including wireless connections using any one of a number of known standards, such as IEEE 802.11x, and wired connections using, for example, serial connections as are well known. By connecting a computer to a communications bus in a vehicle, a technician has at his or her disposal a wealth of information that is useful for diagnosing the state of various components in the vehicle, and typically is useful for maintaining and/or repairing the vehicle.

Generally, all of the major systems and components in a vehicle, such as the transmission, brakes, engine, emissions system, etc. provide messages over the communications bus, enabling diagnostic analysis. Many vehicle components are best analyzed using a software application that is provided by the component's supplier, i.e., Original Equipment Manufacturer (OEM), or that is otherwise specially adapted for diagnosing the state of the component. Because most vehicles contain components supplied by numerous OEMs, numerous software applications are generally used for the maintenance of a single vehicle. Thus, a plethora of software applications for receiving and analyzing such messages is generally available to a technician using a computer connected to a vehicle.

Presently, accessing the many software applications available on a single computer connected to a vehicle for the purpose of diagnosing the state of various components in the vehicle can be confusing for a service technician. For example, a service technician wishing to switch applications analyzing a particular component, e.g., a transmission, must close the first application, find the second application in the computer's operating system, and open it. Alternatively, the service technician might open a second application without closing the first, thus presenting a confusing combination of applications on the computer. Moreover, having more than one application open at the same time may result in unintentional errors as the applications compete for access to the same communications bus. Accordingly, there is a need to be able to manage and access a plurality of applications for diagnosing the state of a vehicle and its components from a single interface. Further, there is a need to be able to ensure that only one application for diagnosing the state of a vehicle and its components is running at one time on a computer connected to the vehicle.

BRIEF SUMMARY OF THE INVENTION

A computer, connected to a communications bus, includes a display that selectively displays a user interface. A plurality of diagnostic applications installed on the computer are capable of receiving data from the communications bus via the connection. Instructions executable on the computer provide a list of the diagnostic applications in the user interface, accept input indicating one of the diagnostic applications to be launched, and launch the indicated diagnostic application. In one embodiment, the communications bus is in a vehicle.

One exemplary embodiment includes an instruction executable on the computer for monitoring the launched diagnostic application.

Another exemplary embodiment includes an instruction executable on the computer for determining whether the diagnostic application has stopped executing. This embodiment further sometimes includes an instruction executable on the computer for stopping communications between the computer and the communications bus prior to launching the indicated diagnostic application.

A further exemplary embodiment includes instructions executable on the computer for accepting input indicating a second one of the diagnostic applications to be launched, and launching the indicated second diagnostic application. In this embodiment said input indicating a second one of the diagnostic applications to be launched is sometimes accepted only if a determination is made that said diagnostic application is no longer running on the computer.

Additionally, an exemplary embodiment includes an instruction executable on the computer for displaying a subset of the diagnostic applications in the list in response to an input.

DETAILED DESCRIPTION

Figure 1:
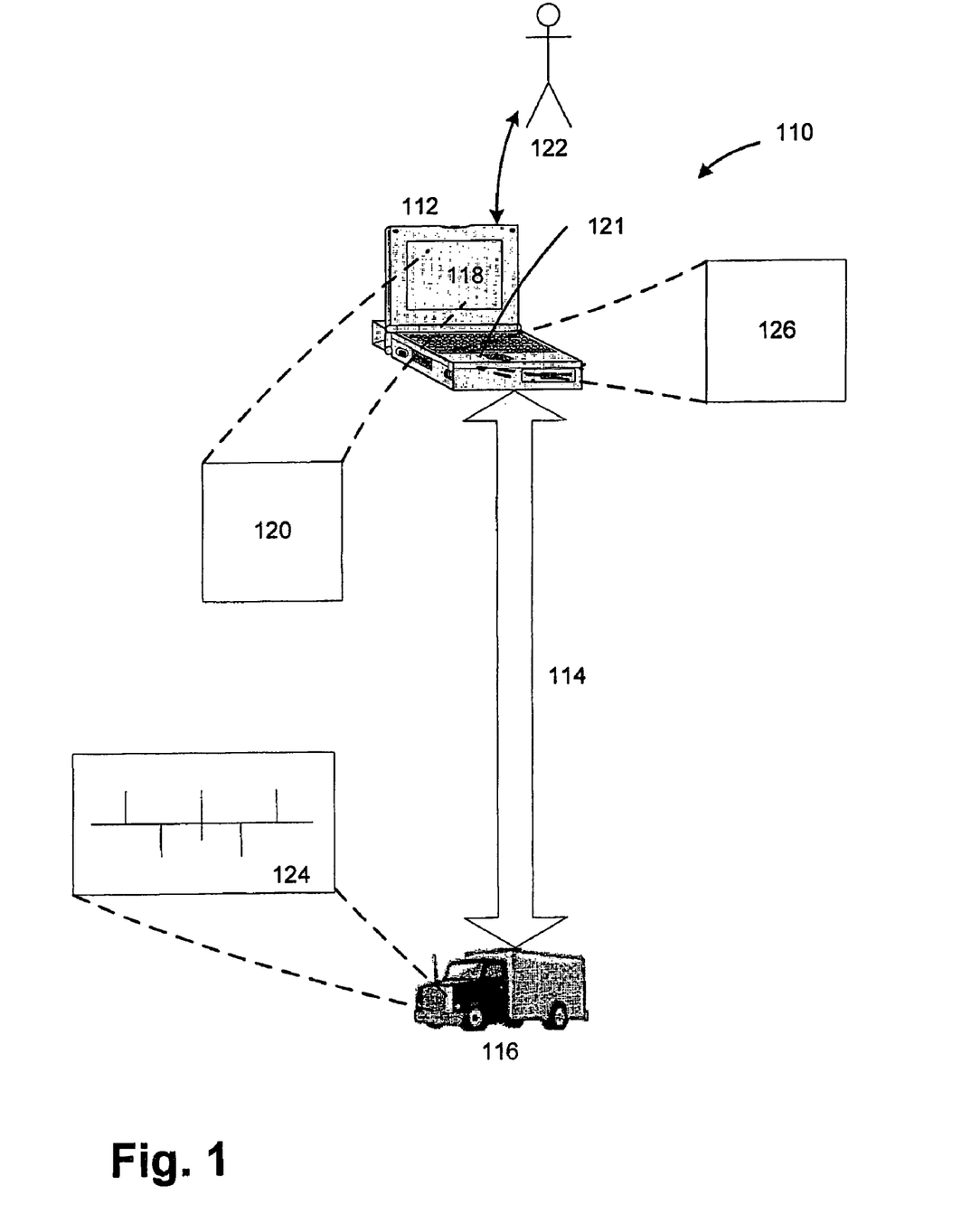
FIG. 1 provides a system overview according to an embodiment.

Referring to FIG. 1, system 110 includes a computer 112 that can be connected by a connection 114 to a vehicle 116.

Computer 112 may be a personal computer such as a laptop or desktop computer, or a handheld computer such as a personal digital assistant (PDA), or Java®—enabled device such as a mobile telephone. In general, one skilled in the art will appreciate that computer 112 could be any computer capable of providing the functionality described herein. Computer 112 generally runs some version of the WINDOWS® operating system, well known to those skilled in the art. However, it is to be appreciated that other operating systems, such as Linux® for personal computers or operating systems adapted to various kinds of handheld computers, such as the Palm OS®, could be used on computer 112.

Those skilled in the art will understand that computer 112 generally includes a processor for processing and a memory for storing executable instructions. Computer 112 also includes at least one display 118 used to display user interface 120. User interface 120 is generally, but not necessarily, a graphical user interface such as will be known to those skilled in the art. The executable instructions may be compiled from computer program code written in the C, C++, or Java™ programming languages, or in some other programming language known to those skilled in the art. Computer 112 also generally includes one or more input devices 121 such as a keyboard, pointing device, etc. Computer 112 is generally accessed by a user 122.

Computer 112, via connection 114, is capable of monitoring, testing, and/or analyzing communications occurring on a communications bus 124 in vehicle 116 using any one of a plurality of diagnostic applications 126. Diagnostic applications 126 may include any application known in the art capable of sending and/or receiving communications over communications bus 124. Diagnostic applications 126 are sometimes referred to as "OEM Applications", but diagnostic applications 126 are by no means limited to applications made by component suppliers or Original Equipment Manufacturers. They can include any applications capable of sending and/or receiving communications over communications bus 124. Representative examples of diagnostic applications 126 include Eaton Service Ranger, made by Eaton Corporation of Cleveland, Ohio and Dana Corporation of Toledo, Ohio; Cummins INSITE™, made by Cummins, Inc. of Columbus, Ind.; V-MAC III Service Diagnostics made by Mack, Inc. of Allentown, Pa.; Detroit Diesel Diagnostic Link made by Detroit Diesel Corporation of Detroit, Mich.; ACom Diagnostics made by Bendix Commercial Vehicle Systems of Elyria, Ohio; and International® Master Diagnostics (MD Fleet) made by Navistar International Truck Corporation of Warrenville, Ill. These and many other examples of diagnostic applications 126 will be known to those skilled in the art.

Communications on communications bus 124 generally use a well known communications standard, such as SAE J1939 or SAE J1587, defined by the Society of Automotive Engineers (SAE). In some embodiments the user has the option of determining which of several standards, possibly including SAE J1939 and SAE J1587, should be used. It should be understood that other communications standards known in the art may also be used in the present invention.

Connection 114 may be accomplished via a physical connector such as a cable, or by way of radio frequencies or other wireless mechanisms that are well known in the art.

Vehicle 116 in certain embodiments is a car or a truck. However, vehicle 116 could be any other kind of vehicle, including an aircraft, a train, a bus, or a boat, without departing from the scope and spirit of the present invention. Further, communications bus 124 could be located in a kind of equipment other than a vehicle.

Figure 2A:
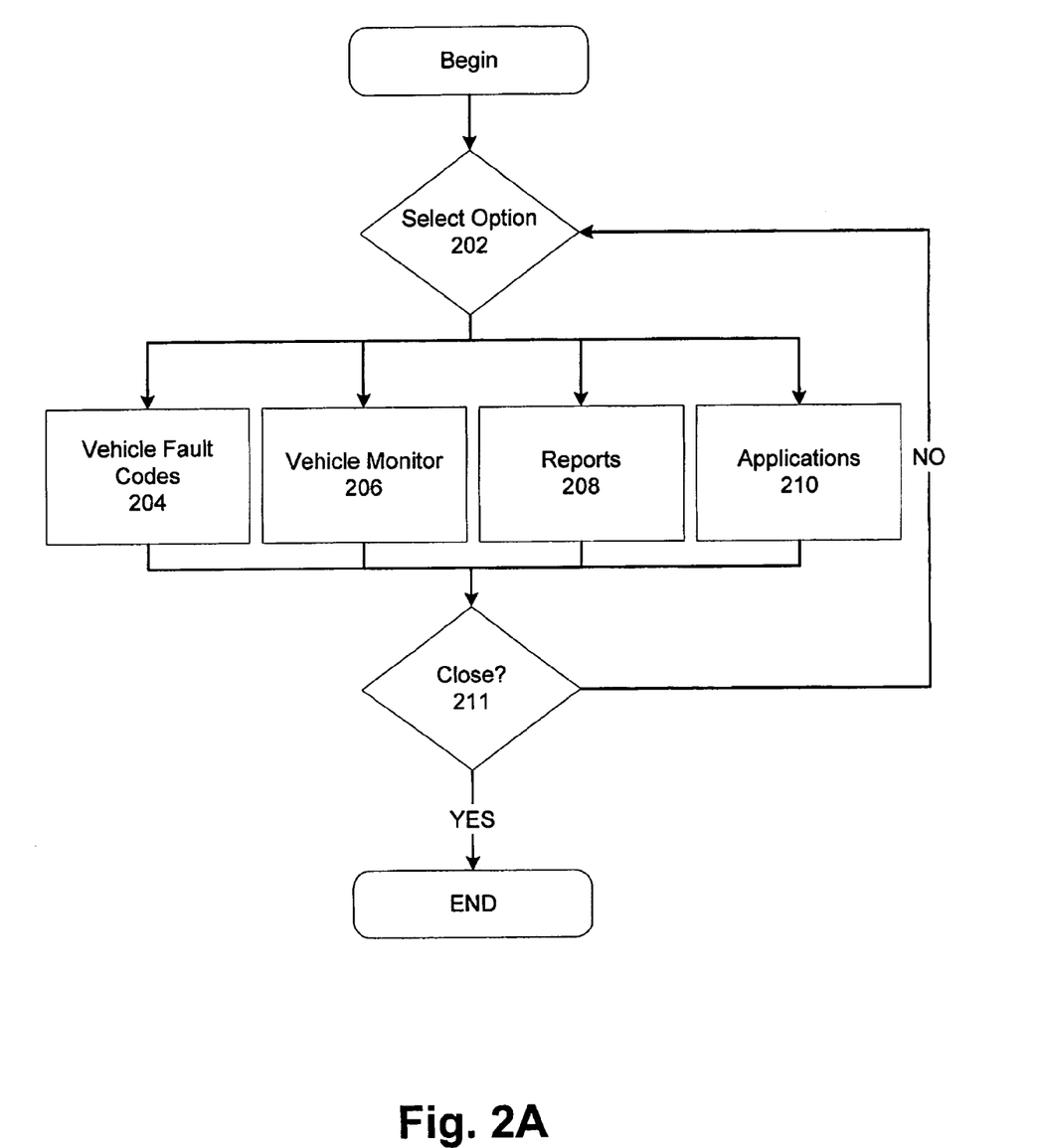
FIG. 2A describes an optional initial process flow used in one embodiment.

FIG. 2A describes an optional initial process flow used in one embodiment. In step 202, a user 122 is presented with a user interface 120, such as the one shown in FIG. 3, from which the user 122 may select various options regarding available functionality. Options available in one embodiment are described with respect to steps 204-210.

Figure 3:
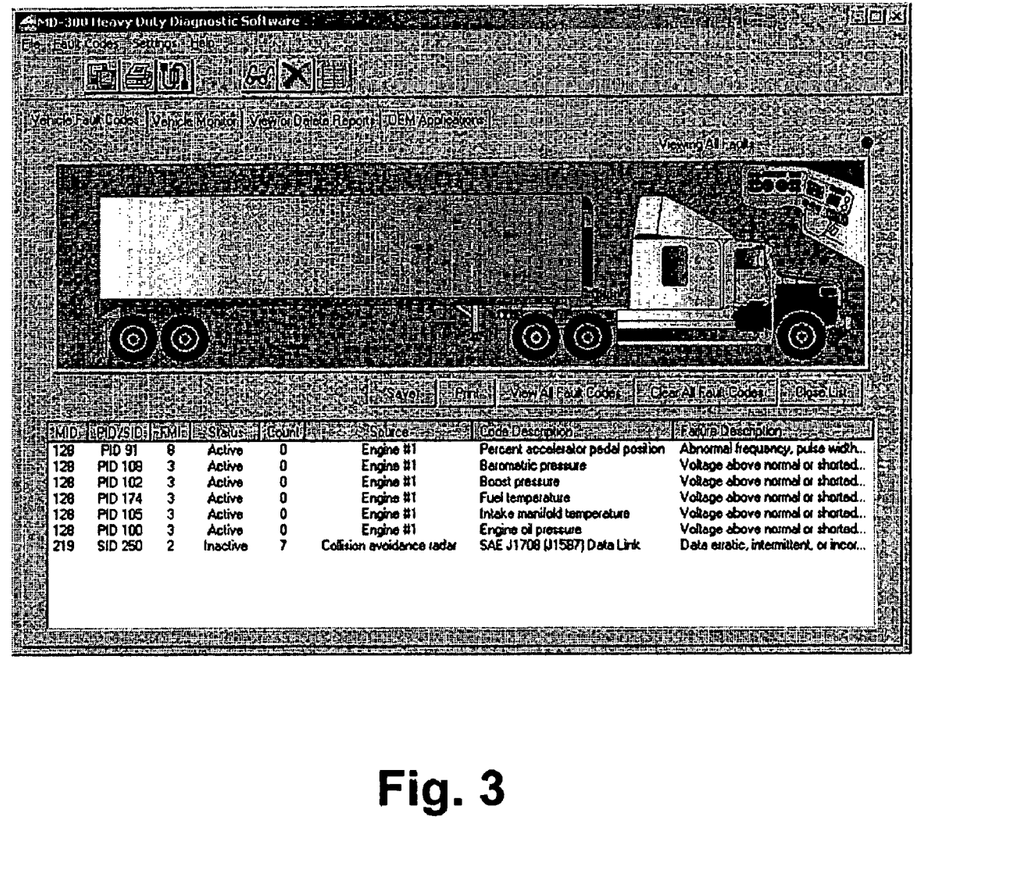
FIG. 3 shows a user interface according to an embodiment through which a user may view fault codes.

Step 204 represents selecting an option to view fault codes generated by various components in vehicle 116. Vehicle fault codes according to communications standards such as those discussed above are well known in the art. In some embodiments, vehicle fault codes are presented to the user 122 by default when user interface 120 is first displayed, as shown in FIG. 3.

Figure 4:
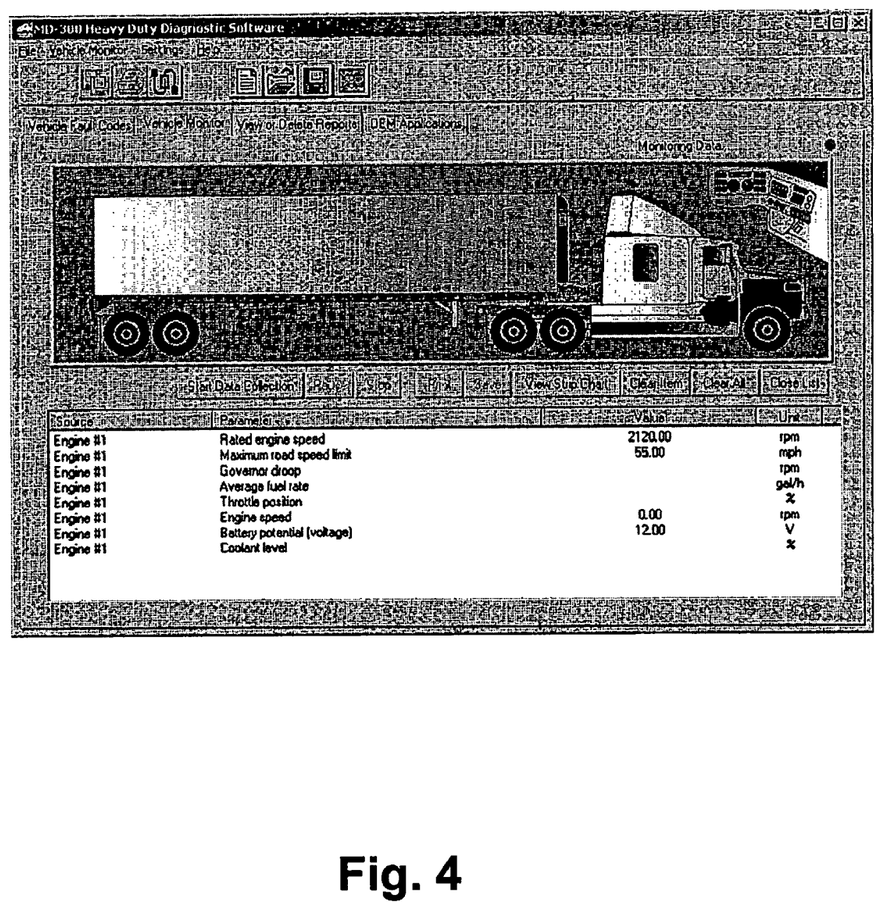
FIG. 4 shows a user interface according to an embodiment in which an option to view data monitored from a vehicle has been selected.

Step 206 represents selecting an option to view data monitored from vehicle 116. FIG. 4 shows user interface 120 when this option has been selected according to one embodiment. Use of the communications standards discussed above to view data from a vehicle 116 is well known.

Step 208 represents selecting an option to view reports based on data from vehicle 116. Such reports will be understood by those skilled in the art, and may include any data available from communications bus 124. To offer just two examples from many, one available report might show a list of fault codes received regarding one or more components in vehicle 116 along with an explanation of each fault code. Another report might show statistics relating to various states in a component in vehicle 116 and the times at which each statistic was recorded, e.g., engine temperature over time.

Figure 5:
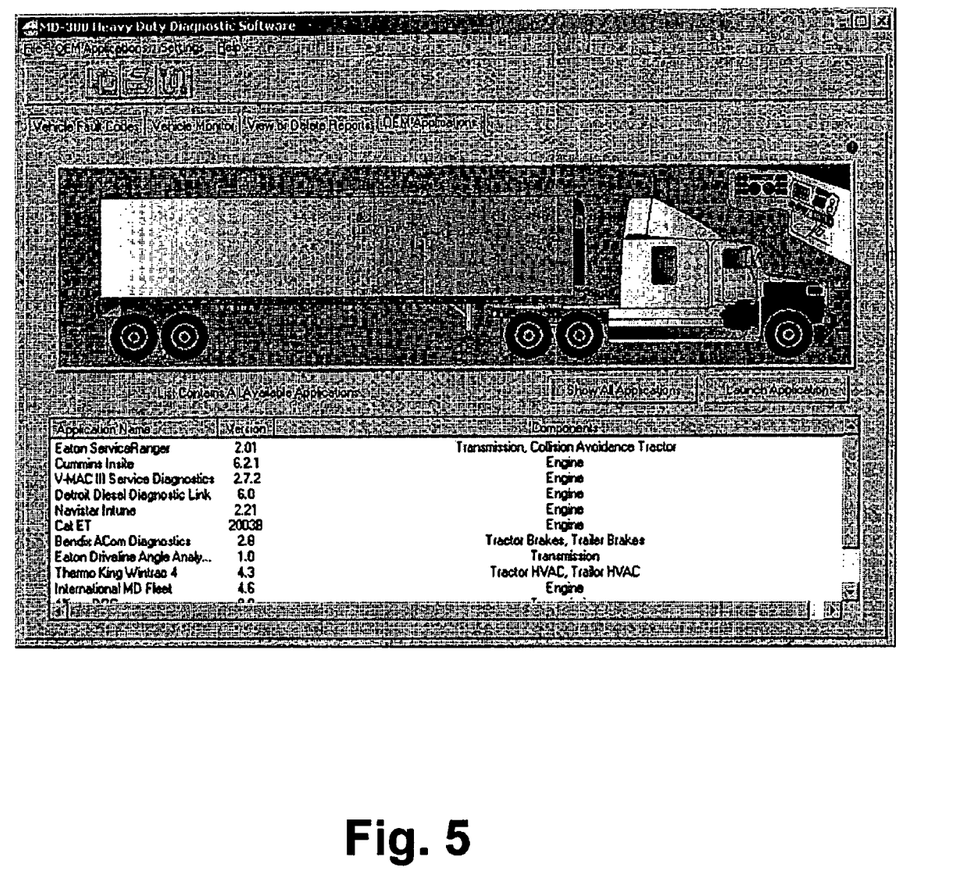
FIG. 5 shows a user interface according to an embodiment in which an option to view a list of diagnostic applications has been selected.

Step 210 represents selecting an option to view a list of diagnostic applications 126, such as OEM applications, which a user 122 can launch. FIG. 5 shows user interface 120 when this option has been selected according to one embodiment. When step 210 is selected, the process flow described in FIG. 2B may be initiated. Of course, it should be understood that the process flow of FIG. 2B may be initiated independently of step 210.

In step 211 the process determines whether input has been received from user 122 requesting that the process close. Means for receiving such input and determining whether or not it has been received are well known to those skilled in the art. If input has been received from user 122 requesting that the process close, the process ends. Otherwise, control returns to step 202.

Figure 2B:
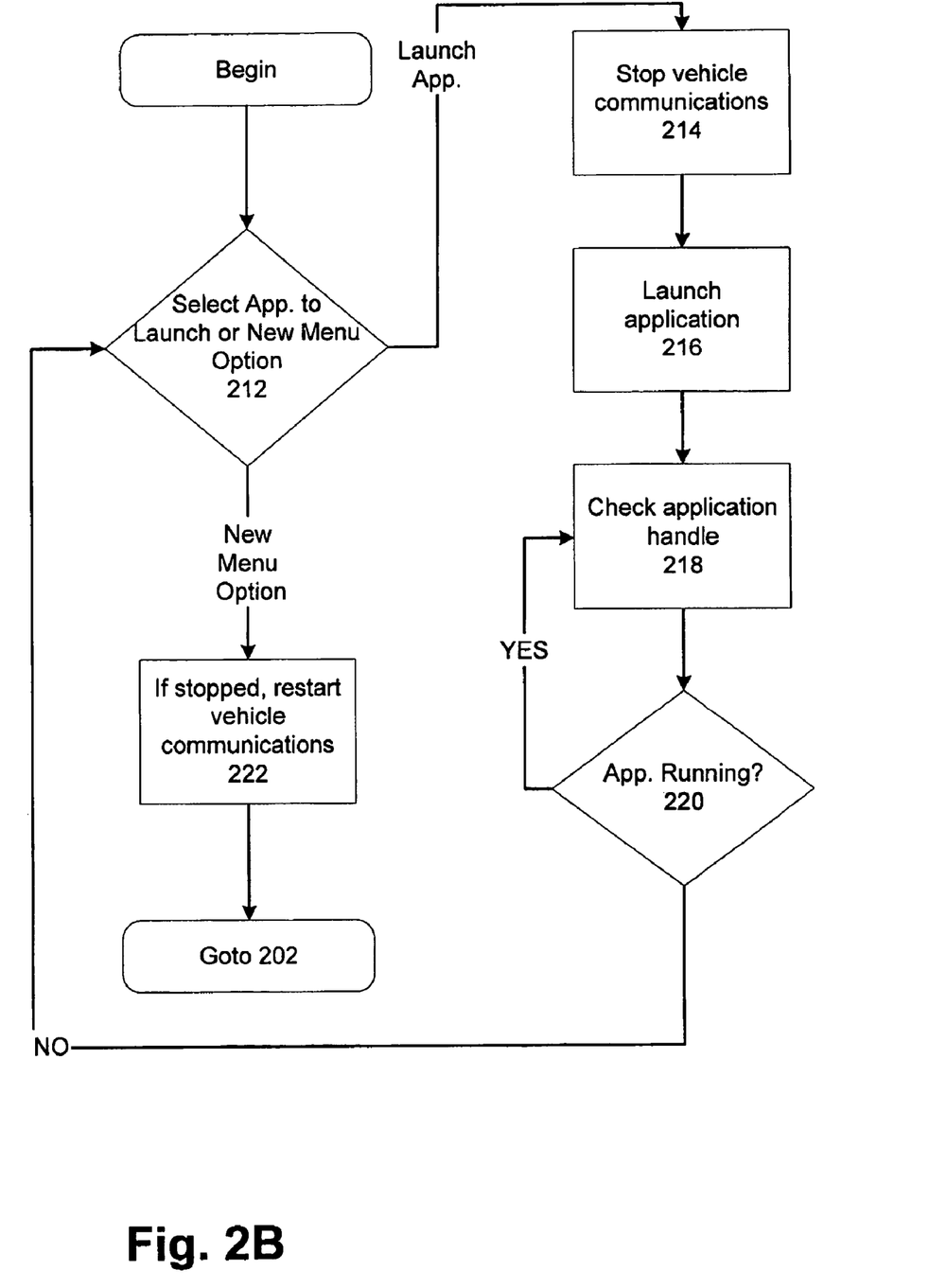
FIG. 2B describes a process flow for launching and monitoring diagnostic applications according to an embodiment.

FIG. 2B describes a process flow for launching and monitoring diagnostic applications 126 such as OEM applications. In one embodiment the process flow of FIG. 2B begins when a user 122 provides input causing step 210 to execute as described above with reference to FIG. 2A. However, it should be understood that the process flow of FIG. 2B could just as easily be preceded by a process flow different than the process flow of FIG. 2A, or could be initiated independently of any other process flow.

In step 212, available diagnostic applications 126 are presented in user interface 120. In one embodiment, user interface 120 appears in step 212 as is shown in FIG. 5. Using an input device 121, a user 122 can select a diagnostic application 126 to be launched. Means for a user 122 making such a selection will be well known to those skilled in the art. Also in step 212, in embodiments in which the process flow of FIG. 2B is integrated other functionality, such as that described with respect to the process flow of FIG. 2A above, a user 122 may select other options, in which case control proceeds to step 222, described below.

Those skilled in the art will recognize that there are a number of different ways in which the list of available diagnostic applications 126 could be populated in user interface 120. For example, in embodiments using the WINDOWS® operating system, an INI file containing a list of available diagnostic applications 126, along with path information and any other information necessary to open each diagnostic application 126, may be used to populate a list in user interface 120. INI files are well known to those skilled in the art. Further, those skilled in the art will understand that INI files can be created manually or by means of a software application configured to automatically generate INI files.

Similarly, the WINDOWS® registry, also well known to those skilled in the art, could be used to store a list of available diagnostic applications 126, along with path information and any other information necessary to open each diagnostic application 126. Methods of automatically populating WINDOWS® registry values are known to those skilled in the art. In addition, those skilled in the art will be aware of other means that may be used to populate a list of available diagnostic applications 126 in user interface 120.

Providing a list of available diagnostic applications 126 in a central location such as user interface 120 provides novel benefits, allowing users 122 to easily and efficiently access diagnostic applications 126. Providing a single user interface 120 for access of all available diagnostic applications 126 ensures that users 122 do not waste time and effort searching for a particular diagnostic application 126 or switching between diagnostic applications 126.

Figure 6:
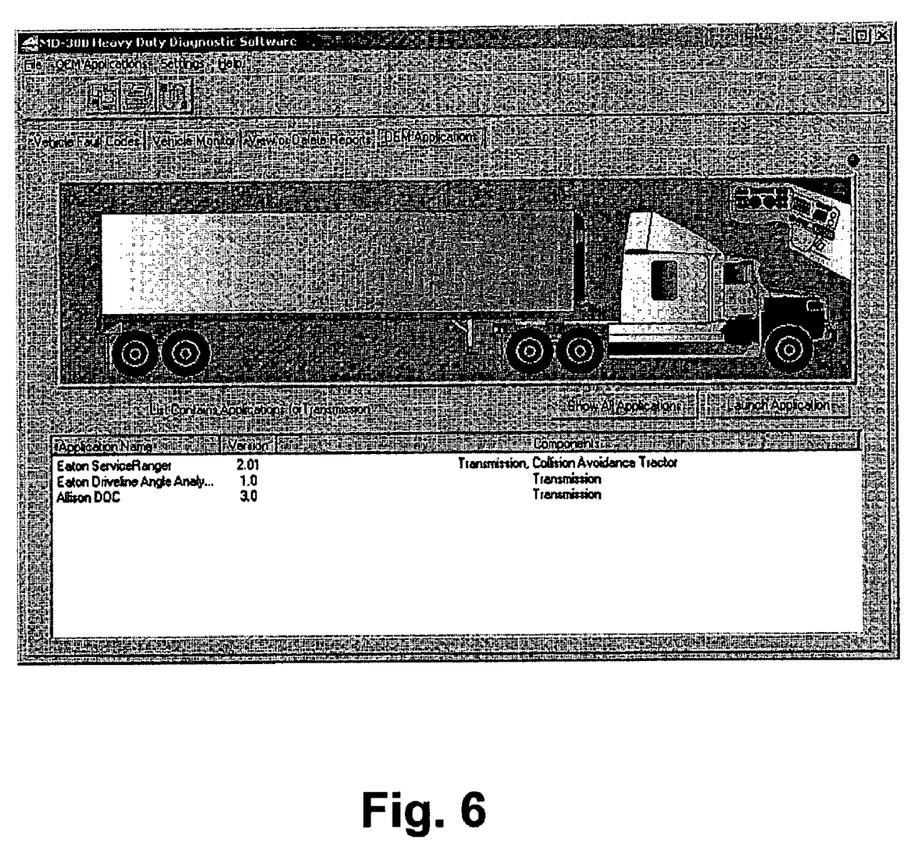
FIG. 6 shows a user interface according to an embodiment in which an option to view a subset of a list of diagnostic applications has been selected.

In some embodiments, a user 122 can select a subset of the diagnostic applications 126 installed on computer 112 for display in user interface 120. For example, as shown in FIG. 6, a user 122 may choose to see only diagnostic applications 126 relevant to a particular component of a vehicle 116. Thus, FIG. 6 shows a list of diagnostic applications 126 relevant to the transmission of vehicle 116. In the particular embodiment shown in FIG. 6, a user 122 can filter the list of available diagnostic applications 126 according to components of vehicle 116 by indicating a particular area of the graphic image of a truck shown in FIG. 6 with an input device 121, the list of diagnostic applications 126 shown being those relating to a component or components in the indicated area of vehicle 116.

In embodiments in which the process flow of FIG. 2B is integrated with the process flow of FIG. 2A, as discussed above, the user 122 can also, from step 212, provide input causing control to proceed to any of steps 204, 206, or 208.

Step 214, following step 212, is optional, and further is appropriate only in embodiments such as those in which the process flow of FIG. 2B is integrated with the process flow of FIG. 2A, as discussed above. In step 214, all communications between computer 112 and vehicle 116 are stopped. The reason for this step is to ensure that the diagnostic application 126 selected by the user 122 in step 212 is the only application sending or receiving communications via communications bus 124. Thus, this step presents the novel advantage of ensuring that the user 122 is aware of which diagnostic application 126 is communicating with a vehicle 116.

In some embodiments, step 214 is accomplished by sending a disconnect command to the driver of the device attached to computer 112 that is communicating with communications bus 124 over connection 114. Such device drivers will be well known to those skilled in the art, as will means for sending disconnect commands to such devices. In one embodiment, the disconnect command is sent using the RP1210A protocol, also well known to those skilled in the art.

In step 216, the diagnostic application 126 selected by the user 122 in step 212 is launched, and a handle identifying the diagnostic application 126 is returned. Handles identifying various objects, including applications, are well known to those skilled in the art. Diagnostic application 126 is generally launched in its own window, and runs normally, i.e., as if a user 122 had accessed the diagnostic program through the operating system of computer 112.

Those of ordinary skill in the art will recognize that embodiments are possible in which more than one diagnostic application 126 is selected in step 212 and launched in step 216. Further, step 214 could be configured to ensure that at most two, three, or some other number of diagnostic applications 126 are running at one time on computer 112.

In step 218, the process checks to determine whether the handle returned in step 216 still exists.

Based on the determination made in step 218, in step 220 the process determines whether the diagnostic application 126 launched in step 216 is still running. That is, if the handle returned in step 216 no longer exists, the diagnostic application 126 launched in step 216 is not still running, and control proceeds to step 212. If the handle returned in step 216 still exists, the diagnostic application 126 launched in step 216 is still running, and control returns to step 218 to continue monitoring the diagnostic application 126.

If it is determined that the user has selected a new option in step 212, control proceeds to step 222. Step 222, like step 214, is optional, and further is appropriate only in embodiments such as those in which the process flow of FIG. 2B is integrated with the process flow of FIG. 2A, as discussed above. In step 222, communications between computer 112 and vehicle 116 are restarted, thus allowing the features discussed above with respect to FIG. 2A to be executed. Thus, user 122 realizes the novel advantage of being able to access any diagnostic application 126 via the same user interface 120 that is used to present fault code reporting and data monitoring functionality with respect to a vehicle 116.

Following step 222 control proceeds to step 202 shown in FIG. 2A.

CONCLUSION

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of the invention and that the disclosed apparatus, systems and methods will be incorporated into such future embodiments. Accordingly, it will be understood that the invention is capable of modification and variation and is limited only by the following claims.

What is claimed is:

1. A system comprising:
   a computer including a display that selectively displays a user interface;
   a connection between the computer and a communications bus;
   a plurality of diagnostic applications installed on the computer that are capable of receiving data from the communications bus via the connection; and
   instructions executable on the computer for:
   providing a list of the diagnostic applications in the user interface;
   accepting input indicating one of the diagnostic applications to be launched;
   stopping communications between the computer and the communications bus; and
   launching the indicated diagnostic application.

2. The system of claim 1, further comprising an instruction executable on the computer for monitoring the launched diagnostic application.

3. The system of claim 2, further comprising an instruction executable on the computer for determining whether the diagnostic application has stopped executing.

4. The system of claim 1, further comprising a vehicle, wherein the communications bus is within the vehicle.

5. The system of claim 1, further comprising instructions executable on the computer for:

accepting input indicating a second one of the diagnostic applications to be launched; and launching the indicated second diagnostic application.

6. The system of claim 5, wherein said input indicating a second one of the diagnostic applications to be launched is accepted only if a determination is made that the initial indicated diagnostic application is no longer running on the computer.

7. The system of claim 1, further comprising an instruction executable on the computer for displaying a subset of the diagnostic applications in the list in response to an input.

8. The system of claim 1, wherein each of the plurality of diagnostic applications relates to one of a plurality of components, each component selectively providing data via the communications bus.

9. A method for launching diagnostic applications on a computer comprising:

displaying a user interface on the computer;

establishing a connection between the computer and a communications bus;

providing a list of the diagnostic applications in the user interface;

accepting input indicating one of the diagnostic applications to be launched;

stopping communications between the computer and the communications bus; and launching the indicated diagnostic application.

10. The method of claim 9, further comprising monitoring the launched diagnostic application.

11. The method of claim 10, further comprising determining whether the diagnostic application has stopped executing.

12. The method of claim 9, wherein the communications bus is within a vehicle.

13. The method of claim 9, further comprising:

accepting input indicating a second one of the diagnostic applications to be launched; and launching the indicated second diagnostic application.

14. The method of claim 13, wherein said input indicating a second one of the diagnostic applications to be launched is accepted only if a determination is made that the initial indicated diagnostic application is no longer running on the computer.

15. The method of claim 9, further comprising an instruction executable on the computer for displaying a subset of the diagnostic applications in the list in response to an input.

16. A system comprising:

means for communicating between a computer and a communications bus;

means for displaying a list of a plurality of diagnostic applications installed on the computer that are capable of receiving data from the communications bus via the connection;

means for providing a list of the diagnostic applications in the user interface;

means for accepting input indicating one of the diagnostic applications to be launched;

means for stopping communications between the computer and the communications bus; and means for launching the indicated diagnostic application.

17. The method of claim 9, wherein each of the plurality of diagnostic applications relates to one of a plurality of components, each component selectively providing data via the communications bus.

18. The system of claim 16, wherein each of the plurality of diagnostic applications relates to one of a plurality of components, each component selectively providing data via the communications bus.

19. A system comprising:

a computer including a display that selectively displays a user interface;

a connection between the computer and a communications bus, wherein the communications bus is included in a vehicle;

a plurality of diagnostic applications installed on the computer that are capable of receiving data from the communications bus via the connection; and instructions executable on the computer for:

providing a list of the diagnostic applications in the user interface;

accepting input indicating one of the diagnostic applications to be launched; and launching the indicated diagnostic application.

20. A method for launching diagnostic applications on a computer comprising:

displaying a user interface on the computer;

establishing a connection between the computer and a communications bus, wherein the communications bus is included in a vehicle;

providing a list of the diagnostic applications in the user interface;

accepting input indicating one of the diagnostic applications to be launched; and launching the indicated diagnostic application.

* * * * *